United States Patent
Tostevin et al.

[11] Patent Number: 6,061,462
[45] Date of Patent: May 9, 2000

[54] DIGITAL CARTOON AND ANIMATION PROCESS

[75] Inventors: Nicole H. Tostevin, Forest Knolls; Mark R. Moran, San Francisco; Justin L. Gardner, San Francisco; Noel M. Marrero, San Francisco, all of Calif.; Robert A. Cook, Boston, Mass.

[73] Assignee: Phoenix Licensing, Inc., Torrance, Calif.

[21] Appl. No.: 08/813,859

[22] Filed: Mar. 7, 1997

[51] Int. Cl.[7] .............................. G06K 9/00; G03B 21/32
[52] U.S. Cl. ...................... 382/100; 40/427; 345/418; 352/40; 368/229; 396/549; D21/592
[58] Field of Search .................................. 382/100, 107, 382/118, 153, 154, 162, 167, 190, 210, 206, 216, 236, 255, 256, 260–264, 266, 269, 274, 283, 291, 294, 296, 298, 299, 300, 308; 345/425–441, 112–115, 473; 348/574, 586; 40/426, 427, 430–431; 352/39–69; 368/229; D21/592

[56] References Cited

U.S. PATENT DOCUMENTS

| | | | |
|---|---|---|---|
| 4,189,744 | 2/1980 | Stern ........................................ | 348/577 |
| 4,258,385 | 3/1981 | Greenberg et al. ....................... | 386/38 |
| 4,449,801 | 5/1984 | Millerburg ............................... | 396/555 |
| 4,695,141 | 9/1987 | Servais ..................................... | 352/50 |
| 4,913,539 | 4/1990 | Lewis ....................................... | 352/87 |
| 4,952,051 | 8/1990 | Lovell et al. ............................. | 352/87 |
| 4,970,666 | 11/1990 | Welsh et al. ............................. | 345/423 |
| 4,987,615 | 1/1991 | Massey ..................................... | 2/206 |
| 5,329,310 | 7/1994 | Liljegren et al. ........................ | 348/147 |
| 5,627,614 | 5/1997 | Weisgerber ............................... | 352/46 |
| 5,680,531 | 10/1997 | Litwinowicz et al. ................... | 395/173 |
| 5,742,939 | 4/1998 | Williams .................................. | 2/69 |
| 5,748,199 | 5/1998 | Palm ........................................ | 345/473 |
| 5,764,980 | 6/1998 | Davis et al. ............................. | 395/615 |
| 5,808,628 | 9/1998 | Hinson et al. ........................... | 345/507 |
| 5,835,096 | 11/1998 | Baldwin ................................... | 345/430 |
| 5,870,097 | 2/1999 | Snyder et al. ........................... | 345/426 |
| 5,877,778 | 3/1999 | Dow et al. ............................... | 345/474 |

OTHER PUBLICATIONS

Culhane, "Animation From Script to Screen", 1988, St. Martin's Press, NY, p. 32–33, 90–92, 326–27.

Finch, "Special Effects: Creating Movie Magic", 1984, Abbeville Press, NY, p. 35, 115, 119–20, 150, 176–77, 245 247.

Foley, "Computer Graphics: Principles and Practice", 2nd Ed., Addison–Wesley Pub., 1990, p. 616–47, 834–41.

*Primary Examiner*—Jon Chang
*Assistant Examiner*—Jayanti K. Patel
*Attorney, Agent, or Firm*—Hickman Stephens Coleman & Hughes, LLP

[57] ABSTRACT

A digital cartoon or animation creation process, alternately describable as digital rotoscoping. Images are obtained in digital format by set-up steps (32, 44), image capture steps (34–36 and 46), and image storage (38, 48). The rotoscoping process (10) includes an image to line art rendering sub-process (14) which optionally may be followed by a specialized line art rendering sub-process (16) or a coloring sub-process (18). The line art rendering sub-process (14) includes a series of filters, particularly including a high-pass filter (68) using a gaussian blur convolution matrix. The specialized rendering sub-process (16) has particular use for carrying image regions having particularized detail through into final images in a manner that such detail is not lost, and the coloring sub-process (18) permits creation of colorized final images.

22 Claims, 4 Drawing Sheets

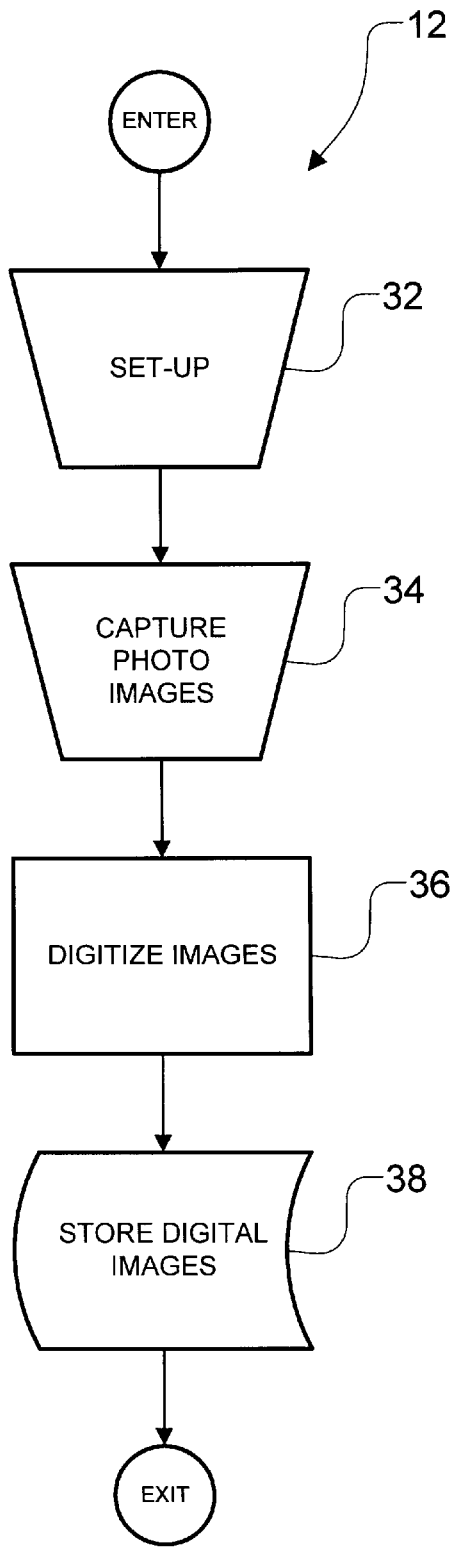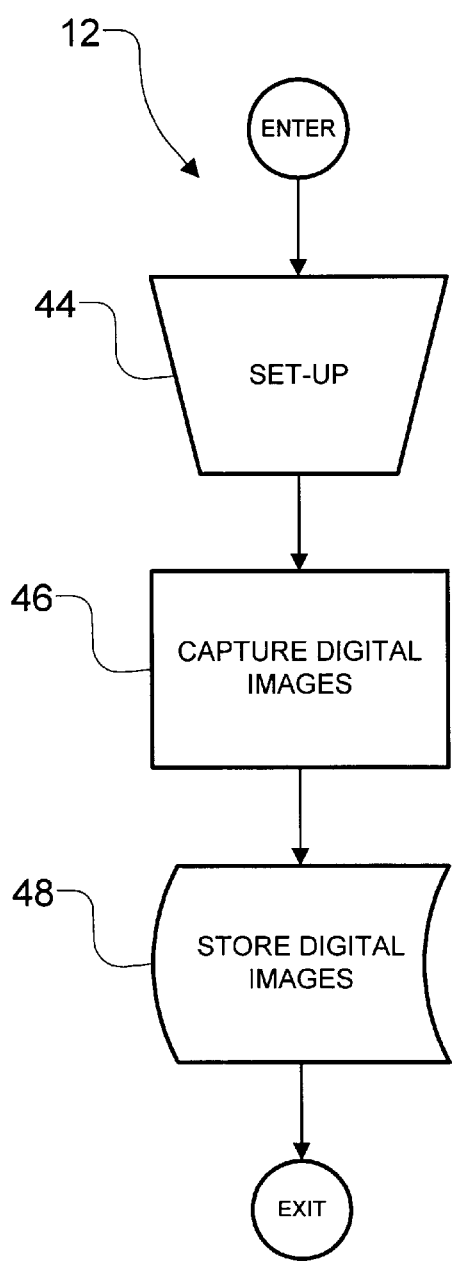
FIG. 2a
FIG. 2b

DIGITAL CARTOON AND ANIMATION PROCESS

TECHNICAL FIELD

The present invention relates generally to a cartooning and animating process used to create visual media, and more particularly to digital implementations of this process to render line art versions, and optionally also into colored line art and line art image sequences. Historically the term "rotoscoping" has been used to describe manual variations of this process, and the inventors adopt that term herein as well for their automated digital process.

BACKGROUND ART

Rotoscoping has been in wide use since its invention in 1914 by Max and Dave Fleischer. These brothers coined the term "rotoscope" to describe a machine which they constructed to assist in manually tracing live action movies, exposure by exposure, to create cartoons and animations. Today the term rotoscoping is widely used to describe the process of projecting film images one frame at a time onto a surface, where line art representations of actors or objects are then traced, or "inked," by hand. Optionally, these outlines may be filled with color, or "painted." See, Shamus Culhane, ANIMATION FROM SCRIPT TO SCREEN, St. Martin's Press, New York, 1988, at pp. 33 and 327; and Christopher Finch, SPECIAL EFFECTS: CREATING MOVIE MAGIC, Abbeville Press, New York, 1984, at pp. 35 and 247.

Many well known examples of rotoscoping exist, although it is not commonly appreciated that rotoscoping was a key technology in their creation. For example, Walt Disney Studios used rotoscoping to a limited extent in its animated production of "Snow White" in the 1930's, and then subsequent to that started to heavily rely upon it for its animated productions.

Rotoscoping is not, however, limited to merely the genre of cartoon-like amusements. Recent examples can also be found in the Horror and Science Fiction genres, which have their own particular needs for realistic appearing special effects. For example, it was used as a hand retouching tool when creating the film "Poltergeist," to enhance a scene where a house imploded into a small hole. Similarly, the film "2001: A Space Odyssey" used rotoscoping to wed small models of space craft with hand-drawn outer space background scenes. Extensive use of rotoscoping was made in the film "Star Wars," to add elements such as the light sabers wielded in fight scenes by the Luke Skywalker and Darth Vader characters, and to enhance explosions.

Unfortunately, a common thread applicable to all rotoscoping to date, and particularly so to rotoscope cartoon or animation production, is its labor intensive nature. Since animation projects of any appreciable size require artist-months or even artist-years of effort, the size of the labor force needed for such rotoscoping projects can result in very high expense. Further, the nature of the labor involved often makes particular demands upon the artist-employees. Artists are generally known for their tendency to be temperamental and transient employees. Hand rotoscope inking and painting is "production line" type work, which many artists regard as demeaning in view of their particular skills and training. Therefore, somewhat understandably, many artists approach rotoscope work as merely an entry level or temporary position, while they maneuver for promotion or look for more glamorous work elsewhere. This often adds considerably to "non-wage" personnel costs of rotoscoping projects, and introduces work consistency and quality problems which project management must allocate additional resources to control.

In sum, what is needed today is an improved rotoscoping process, one which advances this valuable art from a prohibitively expensive and tediously labor intensive one which has been stagnant since the 1930's.

DISCLOSURE OF INVENTION

Accordingly, it is an object of the present invention to provide an automated process for carrying out image to line art rendering.

Another object of the invention is to provide a computer assisted process for carrying out specific image area to specialized line art rendering, to carry subtle and particularly expressive detail through the rendering process.

And, another object of the invention is to provide a computer assisted process for coloring of line art renderings.

Briefly, a first preferred embodiment of the present invention is an image rendering process, comprising obtaining an original image and digitally rendering it into a rotoscoped line art representation of the original image.

Considerable optional variation is possible in the stage of obtaining the original image. Some representative examples include using a color-key background, to perform matte operations, to optimize the execution speed of the process, or to optimize the quality of the product of the process. Advantageous use of increased contrast, distinctive color, increased lighting intensity, sharper focus, and reduced motion blur are representative examples of set-up operations which may optionally be used while obtaining the original image. The image may initially be obtained in a non-digital format, such as photography, and scanned into a digital format; or the image may be directly obtained in a digital format.

Considerable optional variation is also possible in the stage of rendering the original image into a rotoscoped line art representation. A representative example of this includes scaling the image up in size and converting it into monochrome, then applying a sequence of levels filtering, high-pass filtration, contrast enhancement, darkening, reduction to final size, lining subject borders for consistency, and removing visual "noise" from what is now the rotoscoped line art representation.

Briefly, a second preferred embodiment of the present invention is an improved image rendering process, comprising taking an original image and an already rotoscoped line art image and producing an enhanced line art representation. A monochrome version of the image termed a "face" image is created from the rotoscoped image, and a generally conventional alpha channel is produced from the original image. Unwanted content is then removed from the rotoscoped image, and an artist reviews and cleans up the result. One or more key regions are then selected in the face image, their contrast is enhanced, and the face image is integrated back into the rotoscoped image, subject to designation in the alpha channel of what is desired content in the ultimate version of rotoscoped image produced by this particular process. A subsequent or concurrent coloring process may optionally be applied to the rotoscoped image which is produced.

An advantage of the present invention is that it provides an automated process for converting individual images and image sequences into line art renderings. This essentially constitutes automating the monochrome portions of the manual process known as rotoscoping. Using the invention, individual images (e.g., photographs, or digital "screen captures") can be rendered into line art cells. Image sequences can similarly be rendered into line art animations, with no inherent limitation upon the length or order of the sub-sequences used. For example, in this manner entire animated movies may be created. Another example is the creation of computer products such as games and training materials, where sub-sequences are indexably addressed for interactive access by users.

Another advantage of the invention is that it optionally includes a computer assisted sub-process for specially rendering specific image areas into line art. This can be used to carry subtle detail through the rendering process, and even enhance such detail. Generally, basic rotoscoping has not been able to handle particularly expressive portions of some images, such as human faces, hand expressions, and intricately detailed objects. This optional capability may be used on individual images and entire image sequences as well, thereby providing entirely new capabilities in the art of animation.

Another advantage of the invention is that it optionally includes a computer assisted sub-process for coloring line art renderings.

Another advantage of the invention is that it considerably reduces the manual efforts required to produce rotoscopings, as well as enhanced and colorized rotoscopings. As little as one relatively artistically unskilled person may now produce entire feature film length animations or computer CD ROM interactive products with the inventive process, whereas in the past teams of hundreds of skilled artists and coordinating managers would have previously been required. Now an individual or a small team can bring major projects to complete and polished fruition, yet fully meet quality expectations of the commercial marketplace.

Another advantage of the invention is that it is considerably cheaper to use than manual rotoscope inking techniques to produce line art renderings, and painting techniques to produce colorizations. Obvious economy is derived by reduction in labor force size. Indirect further economy is also obtained from elimination of infrastructure to support a sizable labor force. Office space and peripheral staff, such as payroll clerks, are two ready examples. Work materials such as paper, ink, paint, photographic film stock, electricity for projection equipment, etc. are replaced with computer resources which are, in overall balance, cheaper and better tolerated environmentally.

And, another advantage of the invention is that it is considerably faster to use than manual rotoscoping inking techniques to produce line art renderings, and painting techniques to produce colorizations. In addition to the obvious benefits of speeding up project completion times, this provides quality benefits. Overall project quality can be improved because testing may be very quickly performed using the present invention. Further, since it can be expensive or even impossible to recapture images when initial images are found totally defective, prompt image quality testing can provide great economic benefit. This is particularly important when color-key techniques are used when capturing images, since these techniques require particularly high quality initial images. Using the present invention, sample images can quickly be put through the entire rendering process, to catch even the most subtle of flaws very soon after images are captured. Particularly prompt test results are possible when digital type image capture techniques are used. However, even photographic images may be tested by putting them through the now much faster rendering process. Prompt development of the actual image film stock may be carried out, or parallel still frame images may be captured, developed, and rendered to insure that the actual motion picture film reel image sequences will be of suitable quality.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIGS. 2a–b are flow charts depicting the sub-operations within step 12 of FIG. 1, with FIG. 2a depicting initial film image capture, and FIG. 2b depicting alternate digital image capture;

BEST MODE FOR CARRYING OUT THE INVENTION

Figure 1:
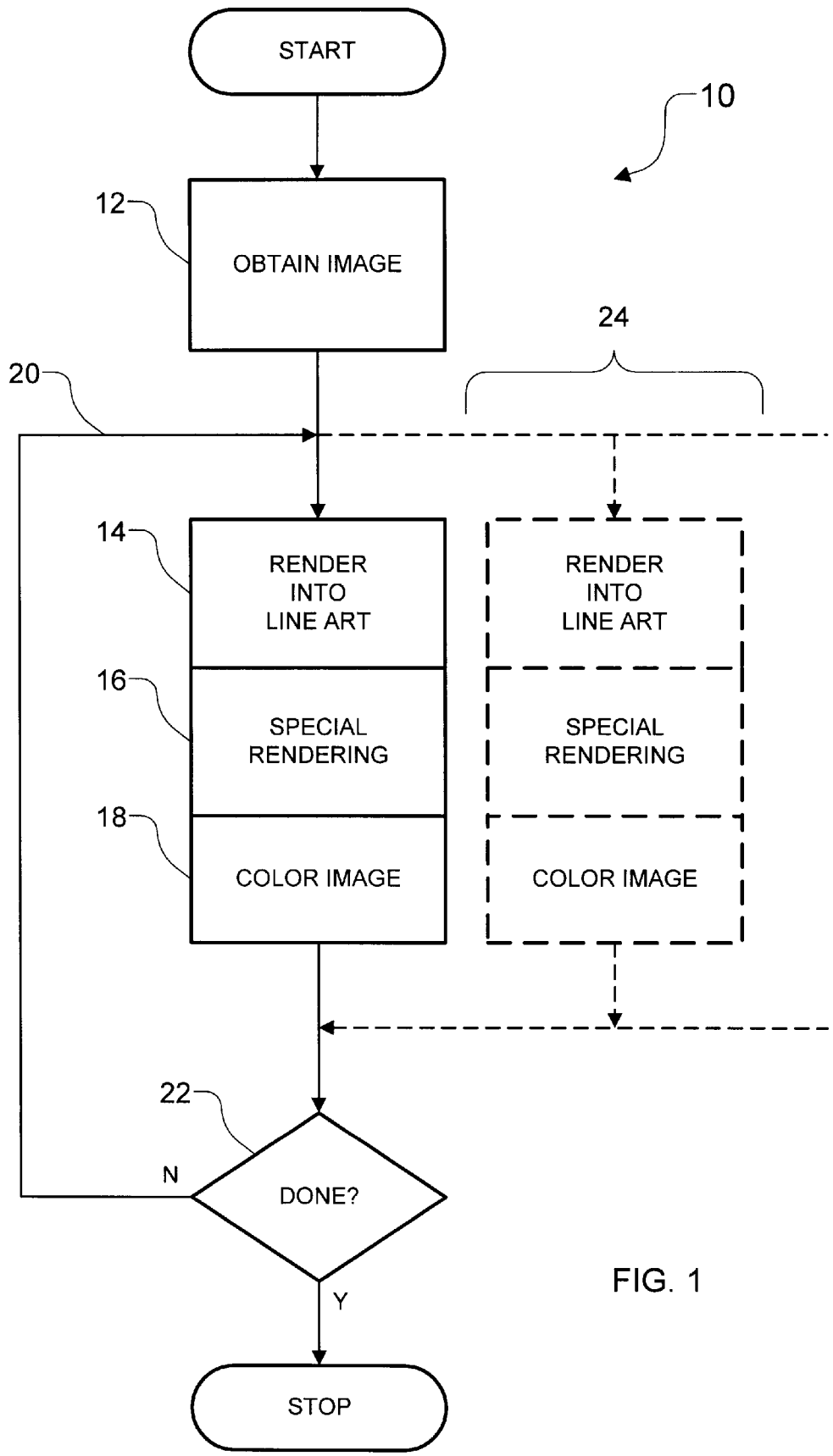
FIG. 1 is a flow chart depicting the basic rotoscoping process.

A preferred embodiment of the present invention is an improved process of rotoscoping. As illustrated in the various drawings herein, and particularly in the view of FIG. 1, the preferred embodiment of the inventive process is depicted by the general reference character 10.

Herein the term "rotoscoping" is used expansively to refer to the rendering of individual images and sequences of images into line art, as well as to optional specialized processing to enhance the quality of such line art and to color in such line art. In the vernacular of manual rotoscoping "inking" and "painting" are commonly used terms for the first and last of these sub-processes, but they are intentionally avoided herein because they unduly connote manual operations.

The term "frame" and its implied limitation to photographic film media is similarly avoided. The term "image" is used instead. It then follows that an "image sequence" is a collection of related individual images (which usually, but not necessarily, are in a particular ordering, say a chronological order of capture). Image sequences can be mere scenes within a complete production, or they may be the complete production itself. Some other examples of image sequences are cartoons, animations, movies, other "moving picture" type effects, and hybrids (e.g., the light saber fight scenes in the film "Star Wars").

Ultimately most image sequences are intended to be played back at a fast rate, typically 30 images per second, to display an apparent "moving picture" to human viewers. It follows that most image sequences necessarily contain a considerable number of individual images. For example, a ten minute cartoon animation may contain 18,000 images, and a 90 minute movie can contain over 160,000 images. Of course not all parts of an image sequence needs to be captured at a rate of 30 individual frames per second. Lower rates such as 5 to 15 images may be captured for still scenes, and then duplicated to get 30 images per second in the ultimate product. Further, much like conventional animation where reuse of individual images and sequences is common, some recycling of image sequences is also possible. However, for image sequences of complex movable subject matter such as human actors this may not be a vary high percentage, both due to continuity issues and viewer detection of unnatural seeming repetition. Therefore, in general, the number of individual distinct images in any complete rotoscoping project can be expected to be quite large in number.

FIG. 1 illustrates the overall rotoscoping process 10 in flow chart form. This includes step 12, obtaining the images or image sequences to be rotoscoped; step 14, general rendering of each image into line art; optional step 16, special rendering; and optional step 18, coloring the line art images. In FIG. 1 step 14, step 16, and step 18 are intentionally shown closely together, to depict that these steps may somewhat overlap. If optional step 16 is to be performed, some preliminary operations for optimal use of it may be performed in step 14. Similarly, additional operations may be performed in step 16 if optional step 18 is to follow. Although step 16 and step 18 are optional they will herein be treated as always present, since the process of rotoscoping is typically used with complex (e.g., human) subject matter, and many genres today use color. Skilled practitioners of image processing will readily appreciate that step 16 and step 18 may be eliminated.

There are basically two ways to process large numbers of objects, sequentially or in parallel (or, of course, in some combination of these). It follows in theory that images also may be processed sequentially or in parallel (e.g., loop 20 with a test for completion at step 22, or with one or more additional branches 24; one is depicted in FIG. 1 in ghost outline). However, this is not completely possible for manual rotoscoping projects of any appreciable size. For a given scene (i.e., frame sequence) all of the individual frames must be rotoscoped before any painting can begin. This is because an artist manually working on a frame sequence needs to have all of the individual frames present during the cleanup and painting phases to ensure proper animation continuity. This also implicitly sets a work unit, wherein each sequence is assignable to only one artist, or at least is closely supervised by one artist, and thus true parallel processing of the individual frames within a frame sequence by multiple artists is impractical. Similarly, it is usually not practical for just one artist to sequentially manually rotoscope all of the frame sequences in a sizable project, because the total effort required is measurable in artist-months or even artist-years. A key benefit of the present invention is that it may be used to perform either true sequential or true parallel rotoscoping, or a more flexible combination of these. The inventors term this "better granularity." Where in manual rotoscoping a frame sequence is the smallest practical grain, with use of the inventive rotoscoping process 10 grain size may be reduced to that of an individual image, or possibly even smaller.

FIGS. 2a–b illustrate two manners of performing step 12 of FIG. 1, image acquisition. Prior art rotoscoping has used various set-up steps followed by capturing individual images on film (typically motion picture film, although multiple logically time related still photographs can also be used). Since such film images are usually small (e.g., on 16 or 35 millimeter film stock), the images are projected larger onto a drawing media where line art renditions are drawn ("inked") by human artists, and subsequent photographic reduction is used to group the still drawings into a usable final product. The present rotoscoping process 10 departs from this method somewhat.

Turning to FIG. 2a, step 32 is set-up, similar in many ways to set-up used in prior art rotoscoping, but optimizable for use with the present invention. Step 34 is an operation to capture images on photographic film, and may also be performed much the same as in prior art rotoscoping. Step 36 digitizing individual images into computer storable and modifiable format, is new to the art of rotoscoping. Finally, step 38 is storage of the digitized images in a manner easily accessible during later steps in the rotoscoping process 10. The inventors have found great benefit in using networked computers and databases to perform the inventive rotoscoping process 10.

Turning now to FIG. 2b, step 44 is also a set-up operation. It may be the same as step 32 of FIG. 2a, or it may be optimized for particular characteristics of the hardware used (this is discussed further below). Step 46 is direct digital capture of images. Finally, step 48, image storage, may be essentially the same as step 38 of FIG. 2a.

While capturing images in the manner depicted in FIG. 2b is only now becoming common, due to the digital hardware necessary for capturing and recording real time action only now becoming available, the inventors anticipate that this method will soon be as common as photographic methods. The operations of capture and recording are necessarily connected (for example, for the process depicted in FIG. 2a these will typically be accomplished by optical effects on chemical media; i.e., photography). An example using direct digital technology is video camera capture (although the argument can be made that even most present video cameras actually rely on analog signals), followed by magnetic video tape recording. Currently most digital technology records images magnetically, but optical media also exist, and virtually any digital media is appropriate for use with the present invention.

Unfortunately, the inventors have found that many present digital systems and recording media work poorly with digital image processing (in general, not just with digital rotoscoping). This is due to the widespread use of interlacing. For example, historically, video has used interlacing. Television uses two sets of interlaced scans, one even and one odd, each taking a 60th of a second, for an overall rate of 30 complete images per second. Little non-interlaced format video equipment is available today, and, to the extent of the inventors' present knowledge, all of that actually uses interpolation of underlying interlaced formats. However, equipment manufactures are currently working on non-interlaced video systems, to serve the growing markets for general video to still frame conversion and for video to computer type image conversion systems.

The problem with initially capturing images in an interlaced format is that adjacent scans become time separated to some degree. Since the whole point of "moving pictures" is to capture motion, time displacement between the same objects in adjacent scans creates spatial separation of parts of the moving objects (i.e., discontinuities), and these appear as horizontal bands in a rotoscoped image. An exaggerated representation of interlacing is:

| Interlaced | Non-Interlaced |
|---|---|
| — — | — — |
| — — | — — |

| Interlaced | Non-Interlaced |
|---|---|
| —— | —— |
| —— | —— |

Interlacing is one reason why still photographs taken of televised images usually appear to have such poor image quality. The underlying format (video) is interlaced, and the change to a non-interlaced format (still photograph) causes the discontinuities stored in the underlying format to become discernible. The human eye does not perceive interlacing at high enough image playback rates. But the still photograph reveals this to be merely illusory. Therefore, the underlying distortion inherent in moving images which have initially been captured in an interlaced format is always present, and once present it is propagated from storage medium to storage medium. To some degree corrective processing is possible (e.g., via interpolation techniques), but this can never match the true time and motion freezing capabilities provided by initial capture in a non-interlaced format, and it has been the inventors'experience that half of interlaced image information must be thrown out.

Set-up Operations

As previously noted, step 32 and step 44 are set-up operations. They maximize the capture of data needed for later steps in the rotoscoping process 10, and they minimize the capture of irrelevant data. It is a time honored maxim in image processing that one cannot enhance what has not been captured to begin with. It is similarly axiomatic that one does not want to waste resources processing that which will never be used. It should be noted that this second point is particularly relevant when computer resources are being used (e.g., processor clock-cycles and storage), something which may not be readily apparent to those more familiar with photographic methods. Computer resources are usually selectively allocable. This is quite unlike photographic type resources, such as the chemicals used for developing film stock. Thus, for example, while one can "mask" out processing of regions in a digital image to save processing resources, one cannot selectively apply chemicals to only particular regions of single film frames in a sequence (i.e., a reel of film). The present rotoscoping process 10 can use this principle to great advantage.

For many rotoscoping projects a desirable set-up operation is the capturing of image sequences in front of color-keyable backgrounds. This technique is known in the general film industry as "blue-screen photography," due to the frequent use of the color blue as a background color (e.g., Finch at page 245). Essentially the same technique is used in the digital image processing field, where the term "alpha channel" is used to refer to creating a separate "channel" of information to direct treatment of corresponding pixels in an image (often also referred to as a channel, an "image channel"). See e.g., Foley et. al., COMPUTER GRAPHICS PRINCIPLES AND PRACTICE, Addison-Wesley Publishing, 1990 (2nd ed.). Since basic blue-screen and alpha channel techniques are well known and conventional they will not be extensively discussed here.

In the present inventive rotoscoping process 10 an alpha channel may serve additional purposes. In addition to the conventional use for elimination of unwanted image content by masking out regions, it may be used for speeding up processing of images by restricting such processing to only the desired portions of the primary channel (i.e., for selective allocation of computing resources). And, as will be described extensively below, it also may be used to enhance quality aspects of the rotoscoping process 10 itself.

An example of using color-keying advantageously is to capture image sequences of actors performing their roles in mock sets, and then rotoscoping into the image sequence a "virtual" set. A mock set can have physical constraints mapped out, say with blue wire guides for walls and furniture, for the actors to follow when moving about. Then, after the actors' scenes are shot, the image sequence is rotoscoped, masking out the mock set by use of the color-keying. (In conventional film arts the term "matte" is sometimes used for this process.) Next, a new world is drawn in and colored around the rotoscoped renditions of the actors. This example is essentially a combination of digital rotoscoping and manual artistic techniques to add in the simpler background.

Another desirable set-up operation is the use of strong contrast lines on actors' bodies and costumes, as well as on the edges of objects. This enhances the ability of the rotoscoping process 10 to maximize line art rendering quality. Contrast enhancement may also be accomplished by selective choice of clothing and make-up. However, it has been the inventor's experience that human faces, and occasionally other critical viewer focus points as well may require special treatment (non set-up aspects of this are discussed extensively below as SPECIALIZED LINE ART RENDERING). Highly detailed and subtly expressive image regions like human faces do not go through rotoscoping well, often losing most emotive expression and appearing unrealistic. To handle this the inventors use special face make-up which increases contrast, but which does not produce lines. Selection of actors with particular facial structure has also been found to be highly beneficial, since the inventors have found that conventionally beautiful faces may rotoscope flatly, while highly articulated faces often have expressive qualities that come through the process well.

Still another set-up operation may be particular tailoring of light intensity. Use of bright even lighting during image capture is important. It decreases the appearance of creases and wrinkles, as well as of shadows. It also helps to control defocusing and motion blur, which should be avoided because they decrease the ultimate line art definition and create artifacts in the later steps of the rotoscoping process 10. To avoid defocusing one may use higher camera apertures, which usually require brighter lighting to accomplish. Higher aperture values also produce greater depth of field, which can help to insure that the actors and objects remain within the field of focus. (Use of wide angle camera lenses may also help here, since they produce a greater depth of field than longer lenses.) Motion blur can be reduced by increasing camera shutter speed, which also usually requires brighter lighting to accomplish. Of course problems due to higher apertures and shutter speeds may often be mitigated by using higher speed film (assuming the image capture method even uses photography), but this can introduce grain that reduces the quality of the rotoscoping process 10 in later steps.

Yet another set-up operation may be new use of color. When rotoscoping is to be performed, what colors are actually present when images are captured becomes either irrelevant or flexibly exploitable. For example, non-linear color response in the cells of a charge-coupled device ("CCD") type video camera may be exploited to better capture contrast by dressing actors in, say, orange and green. These colors may now be used because all color will be eliminated during the later line art rendering process, and may even be replaced with other colors still later during the optional coloring process (step 18). Further, the lighting which is used does not have to produce "true" colors. Thus a high light intensity, noted as desirable above, may now be obtained from sources which are cheaper than those usually required for general photography. The key criteria now is merely that the background colors and the subject's colors remain distinct.

Digitizing

Step 36 and step 46 convert the captured images into computer processable digital format. In the inventors' current preferred embodiment, traditional photographic type motion picture image capture is used. This is currently felt to be most cost effective. Sequences can be filmed on 16 mm, 35 mm, or some other size film stock. Traditional cutting room editing techniques may then be applied, as desired. In the preferred embodiment the photographic film sequences are all transferred to D1 digital format (a common and cost effective sequential tape storage format having 720×486×24 resolution), and a timecode is added to help identify the images. It is at this point that the inventors start the process of cutting-room type editing. An edit decision list is created and used to selectively transfer desired image frames from the DI format to archival mass storage (e.g., a tape format like Exabyte, a trademark of Exabyte, Inc. of Bolder, Colo.). This archival mass storage is used by the inventors because storage on direct access computer media (e.g., hard disks) is not presently felt to be as cost effective. For rendering into line art and for coloring during the rotoscoping process 10, selected image sequences are copied from the archival storage into standard computer storage (e.g., a database stored on one or more computer hard disks).

It should be noted that DI format is actually an interlaced format (and hence the raw images stored as data on the archival format are technically in that form), but since the initial images here were captured in a non-interlaced form (e.g., photography) they do not contain any spatial discontinuities, and the images can easily be converted back to a true non-interlaced form at any time. In the inventors' preferred embodiment this is done via a simple indexing routine when the images are transferred from the archival format into the computer database and stored there for use by the rest of the rotoscoping process 10.

General Line Art Rendering

Figure 3:
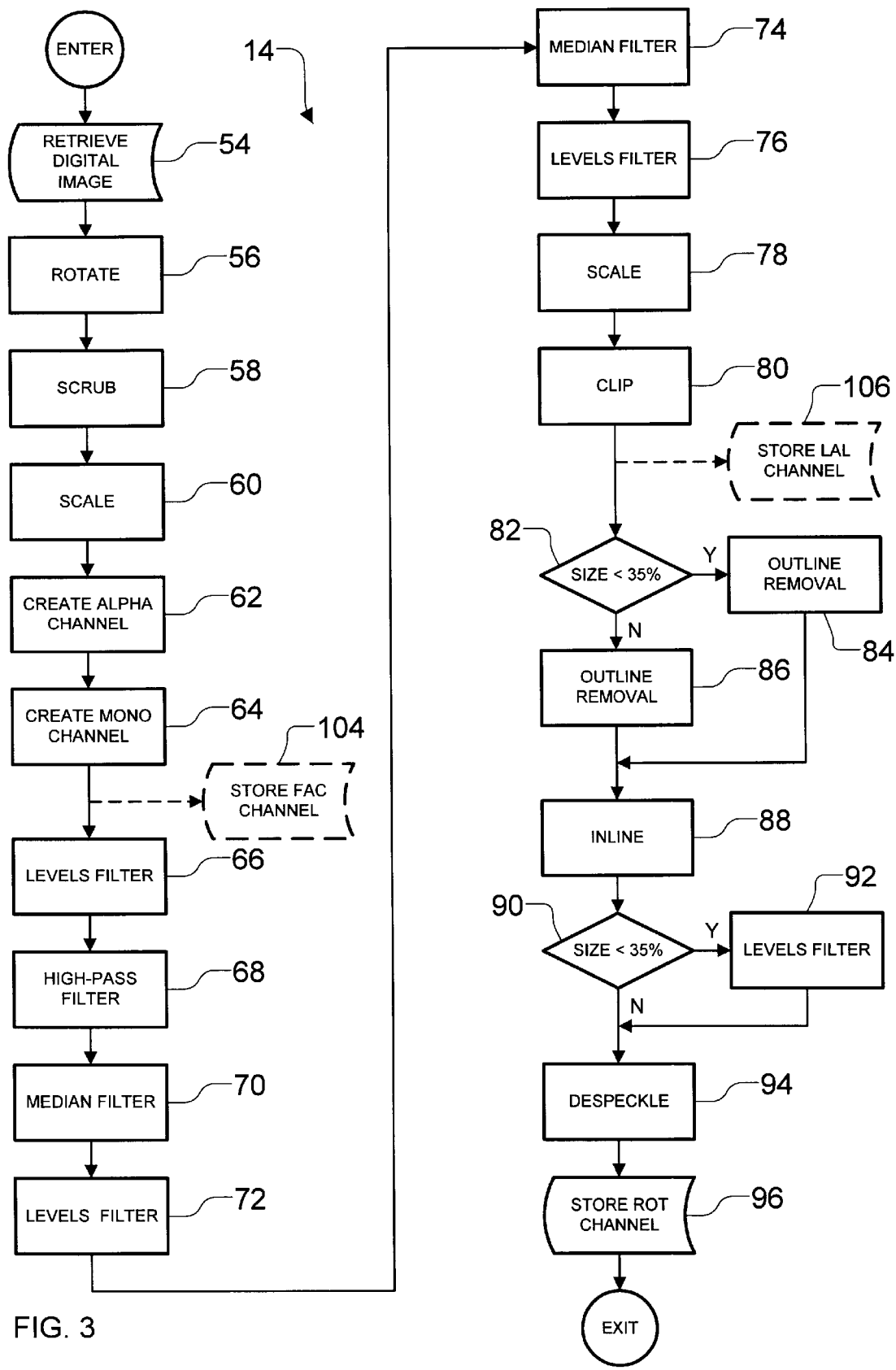
FIG. 3 is a flow chart depicting the sub-operations within step 14 of FIG. 1.

FIG. 3 illustrates in flow chart form the sub-operations of general line art rendering (step 14 in FIG. 1). These are: step 54, retrieving an image from the database created in step 38 or step 48; optional step 56, rotating the image if it was captured using a non-standard camera orientation; step 58, scrubbing the image; step 60, scaling the image up; step 62, creating an alpha channel; step 64, creating a monochrome channel (which henceforth is the channel being worked with, unless noted otherwise); step 66, applying levels filtering; step 68, applying a high pass filter; step 70, applying median filtering; step 72, applying levels filtering; step 74, applying median filtering; step 76, applying levels filtering; step 78, scaling down; optional step 80, clipping to final size; step 82, determining the amount of border to remove; step 84 or step 86, removing thick borders; step 88, adding a single pixel border; step 90, determining if the image requires step 92, additional levels filtering; step 94 despeckling; and finally step 96, storing into the database what is now a completely rendered line art image.

An important general point on filters is appropriate here. There are two ways to implement an image processing filter. One is to "side-effect" the original image as it is processed. That is, to modify the input image as one goes, so that as pixels in the next row are processed, they refer to the recently changed pixels in the row above. The inventors' method is the more conventional approach. An output buffer separate from the input buffers is used, and every pixel is generated from the original input buffers.

Step 54 is retrieval of an image copy from the archival storage copies created in step 38 or step 48. The copy or "buffer" will here be termed the "image channel," and at this point it has 720×486×24 resolution (that of D1 format).

Step 56, rotating the image channel, is optional. It is only used when the image was "shot" with a vertical framing. An example of when this might be used is to film with the camera turned sideways to capture an image sequence of an actor walking in a corridor. Such framing is useful to fill the film plane as much as possible with desired content (i.e., the actor). If horizontal framing was used instead, one would have to throw away the side portions of images, and the ultimate part of the image used would have less resolution. Thus step 56 is a rotation operation to orient images to 486×720×24, so that they are processed as vertically framed images. Alternately, this can be done after the general line art rendering process, say during specialized rendering (e.g., grabface, discussed below). The inventors opt to do this here at the beginning, so that it is only necessary to rotate the single source image instead of all of the output images.

At this point further discussion of the different resolutions used by the inventors for horizontal and vertical framing may help avoid confusion. In one very large project, named THE LAST EXPRESS (discussed further below), the inventors used extensive amounts of vertical framing because many scenes were set in train corridors. The resolutions of the ultimate rendered images produced in this project are 480×360×8 for horizontal images and 320×480×8 for vertical ones. It was desired, however, to implement a largely generic form of the present rotoscoping process 10 which could handle both of these resolutions, and which at intermediate stages used the same resources for each (e.g., 720×486×24 and 486×720×24 resolutions effectively require the same computer resources to handle).

Step 58 is scrubbing the image channel, to pull the image out from the background and to enhance border transitions. In the preferred embodiment each pixel of the image channel is processed by taking a centered three by three (3×3) matrix (some practitioners of image processing also refer to this as a radius one matrix). If at least six of the nine pixels in the matrix are judged as blue (having a strong blue component and weak red and green values), the center pixel is set to saturated blue. (Blue is an arbitrary choice of color-key color, but overwhelmingly the most common in the industry.) This is done to chop off ambiguous pixels near a subject's periphery, where lens optics and other distortion may have blurred the distinction between foreground and background. The result here tends to reduce the size of the subject by one pixel. This step is performed only on the original 24 bit image.

Step 60 scales the image channel up and changes its aspect ratio. In the inventor's preferred embodiment the image is at 720×486×24 (or 486×720×24) resolution. This is now increased to 1440×1080×24 (1080×1440×24 for vertically framed images). Scaling is performed because it is the inventors' general experience that the greater the scaling, the thinner the lines which one can obtain in the ultimate line art (i.e., the better the definition which can be obtained). This becomes apparent after step 68, the high pass filter, which creates line output of a fixed width. Otherwise the lines produced might be too thick to work optimally in subsequent steps. Of course there is an obvious trade-off made when scaling; the greater the amount of scaling, the greater the number of pixels which must be processed in later steps. Also, if the image is scaled too large, the resulting thin lines will take on a jagged staircase effect.

As noted, the aspect ratio is also changed. Obviously a 1440×1080 resolution does not reflect a true 2× scaling (which would be 1440×972), but rather an anamorphic scaling. In anamorphic scaling, the horizontal and vertical dimensions of an image are scaled differently, changing the aspect ratio. The D1 resolution of 720×486 would have an aspect ratio of approximately 4.44:3 when displayed on a computer monitor with square pixels. The anamorphic scaling is used to correct this to an aspect ratio to 4:3 by scaling up the vertical dimension to a greater extent than the horizontal. Therefore, part of step 60 is adjustment of the image channel aspect ratio into what will be roughly the final proportions of the rotoscoped line art, i.e., 4:3. This is performed even though with vertical images the sides will ultimately be chopped off (recall that in the preferred embodiment the horizontal images are ultimately rendered into an unclipped 480×360 resolution, and the vertical ones get rendered and clipped to 320×480). This is felt to be an acceptable trade-off so that the image is not stretched on a computer monitor with square pixels. By combining the two operations of scaling and aspect ratio changing into step 60, less distortion is introduced into the overall process.

Step 62 creates a 1440×1080×8 alpha channel from the 1440×1080×24 image channel (or a 1080×1440×8 alpha channel for vertical images). In principle, the procedure to create the alpha channel is very simple. It is assumed that all blue pixels are outside of the alpha channel, and that all non-blue pixels are within it. For blue pixels in the scrubbed 24 bit image channel, the equivalent eight bit alpha channel pixels are set to black (white is used for anything else). In the preferred embodiment, for speed efficiency, the alpha channel is in eight bit monochrome. A single bit alpha channel would require less memory, but it would also require processing as a slower bit-wise check on most present computer systems.

Step 64 converts the 1440×1080×24 image channel into a 1440×1080×8 gray scale "mono channel" ("mono" for monochrome; note also that this is 1080×1440×8 for vertical images). This may be performed in any conventional manner.

Step 66 applies at least one levels filter to the mono channel, to increase contrast of low and mid-range values. Since the mono channel is in an eight bit format, its possible 256 values range from zero for absolute black to 255 for absolute white. The levels filter used by the inventors requires three supplied parameters. The first and third are integer values in the range of zero to 255, and the second value is a non-integer value ranging from 0.0 to 10.0 with the center at 1.0 (i.e., a nonlinear mapping). The levels filter clips the range below the first value (i.e., forcing all pixels in this range to zero, absolute black); clips the range above the third value (i.e., forcing all pixels in this range to 255, absolute white); and expands the dynamic range back to zero to 255 while centering about the second value. It follows that within the 0.0–10.0 range of the second parameter, 1.0 indicates no dynamic range center shift, less than 1.0 "shifts" the image darker, and greater than 1.0 shifts the image lighter. Level filters per se are conventional art found in many graphics programs (e.g., Photoshop, trademark of Adobe Corporation).

The inventors have experimented considerably with various levels filter settings, and also with running levels filters multiple times in an iterative manner. While the needs for a specific project may vary considerably, the inventors have successfully used two passes with values of 0:1.6:249 and 0:1.6:212 respectively for step 66. Thus, when using such parameters for a first pass, no range is clipped at the dark end (recall that zero equates to black and 255 equates to white), about three percent of the light end range is clipped, and when dynamically expanded back to the full zero to 255 range the image is considerably lightened (due to the 1.6 value shifting the new dynamic range center toward the light end). Similarly for the second pass, no dark end clipping occurs but about 17% of the light end is clipped and the image is even further lightened.

In the inventors' preferred embodiment the alpha channel is not used when applying levels filtering. This is a subjective decision based upon the relative efficiency of checking each mono channel pixel against its alpha channel counterpart to determine whether a levels adjustment is appropriate. Instead the inventors just apply adjustment to all pixels and let any zero (black) values remain zero.

Step 68 is high pass filtration to remove the low frequency spatial information from the mono channel. In the inventors' preferred embodiment, step 68 is performed by applying a 15×15 (radius seven) gaussian blur convolution matrix to each image content pixel in the mono channel to obtain a blur value. Next the blur value is subtracted from the original pixel value (since a gaussian blur function acts as a low-pass filter, and the inverse of that is what is desired). And then 128 is added to normalize the final value across the range between zero and 255. Whether or not a mono channel pixel is image content which it is desirable to process is determined by whether its alpha channel equivalent is set (i.e., zero or black). Therefore, blurred outside edges which may result in this step can be trimmed off later using comparison with the alpha channel.

Those skilled in the relevant arts will readily appreciate that there are other ways to implement high pass filters, ways which would even render better results, but which would require more processing resources (e.g., computer processor power). Accordingly, the scope of the present rotoscoping process 10 should not be interpreted narrowly. The spirit of the present invention fully encompasses all suitable high pass filtering methods.

Step 68 is a key point in the general line art rendering sub-process (step 14). The main goal of the steps up to here has been to prepare what is in the original image channel for use in this step, and the main goal of the subsequent general line art rendering steps is to clean up the output of this step. This is not to minimize the importance of the other steps, but rather to emphasize that this step is pivotal in the line art rendering process.

Step 70 is median filtering to remove noise by blurring it out before the mono channel contrast is enhanced. In the preferred embodiment, mono channel pixels are set to a median value derived from a centered 5×5 (radius two) matrix. Here alpha channel based selectivity of individual pixel processing is used in the preferred embodiment of the rotoscoping process 10 to increase efficiency.

Step 72 applies at least one levels filter to the mono channel again. This is somewhat analogous to step 66, except that different parameter values will typically be used. Once again, while the needs for a specific project may vary considerably, the inventors have successfully used two passes with values of 98:1.0:127 and 98:1.0:243 respectively. Levels filtering is used here because the output of step 68 and step 70 is very low in contrast, and the ultimate goal is rendered line art having high contrast. While in principle the goal is seemingly to have pure black lines on a pure white background, it is actually desirable to have intermediate monochrome levels at the transitions between white and black. This produces an anti-aliasing effect which gives the appearance of higher spatial resolution (i.e., smoother looking lines).

Step 74 is further noise removal, again by application of a median filter to blur out noise before contrast is further enhanced in the mono channel. In the preferred embodiment this is performed in the same manner as step 70.

Step 76 is still additional levels filtering, but here to darken the image in the mono channel. In the preferred embodiment the inventors use only one pass, with values of 110:0.14:235 (note that the second value of 0.14 used here shifts toward the dark end of the range, unlike the previous applications of levels filtering).

Step 78 is scaling down of the 1440×1080×8 or 1080×1440×8 mono and alpha channels to 480×360 or 360×480. In the preferred embodiment this is a direct scaling down by a factor of three.

Step 80 is clipping of the mono and alpha channels for vertical images from 360×480 to the final vertical image size of 320×480. Horizontal images receive no clipping here, because 480×360 is their final size. This could be made more efficient for certain types of vertical images. However, the inventors prefer to keep the system general so that the side areas of the image can be used in certain cases.

Step 82 is a decision step to determine what degree of border outline should be removed. Outlines at this stage are typically quite distinct, and the need for removing or standardizing thickness may vary depending upon the goals in particular projects. In some cases, this step may be dispensed with entirely, and in others, it may require different threshold criteria or additional removal steps. The inventors have used a criteria whether a subject in the image has a height of 35% of the full image to apply two different amounts of outline removal.

Step 84 removes thick outline borders when the height of the subject in an image occupies less than 35% of the height of the full image. Thick outlines here are an artifact of the prior line art rendering steps. The alpha channel is used to determine the outside edge of a subject within an image, then the image is horizontally scanned inward from the leftmost and rightmost edges of the image. (This can be generalized to work from all directions, at the cost of coding complexity.) If there are only a few dark contiguous pixels at such an edge of a subject, say four or fewer, they are removed. Continuous lines across a subject and major dark line art elements near the edges do not trigger such removal. This step is usually important only for smaller subjects where the edges need to be thin. A key point here is to use a smaller removal value for smaller subjects, so that, for instance, a subject's whole head is not removed. A larger removal value can be used for larger subjects because it is rare that any major structure is less than eight pixels. Step 84 is performed only on small subjects and step 86 is performed only on large subjects.

Step 86 is used to remove thick outline borders when the height of the subject in an image is 35% or more of the height of the image. This step operates similar to step 84, except that eight or fewer contiguous border pixels trigger removal.

Step 88 adds a single pixel border around the entire subject in an image. This is accomplished by taking each mono channel pixel falling just inside the alpha channel limits and setting it to black. The inventors term this "inline" rather than "outline" because in the preferred embodiment the line is drawn within the confines of the alpha channel, on top of the rotoscoped subject, as opposed to outside of the original border and around the subject.

Step 90 determines if the subject in an image is small and thus whether any further levels filtering is desirable. The inventors have found it effective and efficient to use the 35% image height threshold as the criteria here also.

Step 92 is the optional levels filtering used when it is determined in step 90 that the subject is small. The inventors prefer to make only one levels filtering pass here, using parameter values of 0:1.0:127 and thus clipping the light end of the monochrome range entirely, by forcing all values above 127 to white.

Step 94 is despeckling. This removes any remaining stray pixels in the mono channel. The preferred embodiment accomplishes this by scanning a centered 3×3 (radius one) matrix, and if the average value of the pixels is too bright (i.e., too high a value) setting the central pixel all the way to white (i.e., to 255). Here also alpha channel based selectivity of individual pixel processing is used to increase efficiency.

Step 96 stores the completely line art rendered mono channel back into the database. From there it may be later retrieved for additional processing (e.g., for merging with specialized line art rendering or for coloring), or for concatenation into monochrome animation sequences. At this point the processed and stored mono channel becomes what the inventors term a ROT channel (ROT for "rotoscoped"). The ROT channel has 480×360×8 resolution for horizontal images, and 320×480×8 for vertical images.

Specialized Line Art Rendering (Grabface)

As a preliminary point, the inventors refer to the sub-process they use to perform specialized line art processing and optionally the initial coloring of image regions as "grabface." This title is an artifact of human faces being the earliest subject matter. However, this should not be interpreted as meaning that only human faces require or are suitable for application of "grabface" techniques. Other human anatomical regions (e.g., hands), animal anatomy, and even particular inanimate objects are also fit subjects for grabface treatment. To avoid confusion on this point, readers are urged to interpret the word "face" as describing a presented region of an object generally, rather than as merely a portion of anatomy.

If grabface is to be applied to one or more regions in an image some optional steps are carried out. As shown in FIG. 3 (in ghost form), these include: step 104, creation and storage of a FAC channel (FAC for "face"); and step 106, creation and storage of a LAL channel (LAL for "little alpha").

Step 104, FAC channel creation is scaling down a copy of the monochrome channel after step 64 from 1440×1080×8 to 480×360×8 for horizontal images (a direct 1:3 scaling), or from 1080×1440×8 to 320×480×8 (by a direct 1:3 scaling to 360×480×8 and then clipping to 320×480×8). Results of this are stored in a database for later use. Step 106, LAL channel creation, is effectively the same process, except that it is performed on the alpha channel and is performed after step 80. The ROT channel produced in step 96 is already at either 480×360 or 320×480 resolution, so no additional work is needed on it. The FAC channel stored in step 104, the LAL channel stored in step 106, and the ROT channel stored in step 96 are the inputs to the grabface sub-process.

Figure 4:
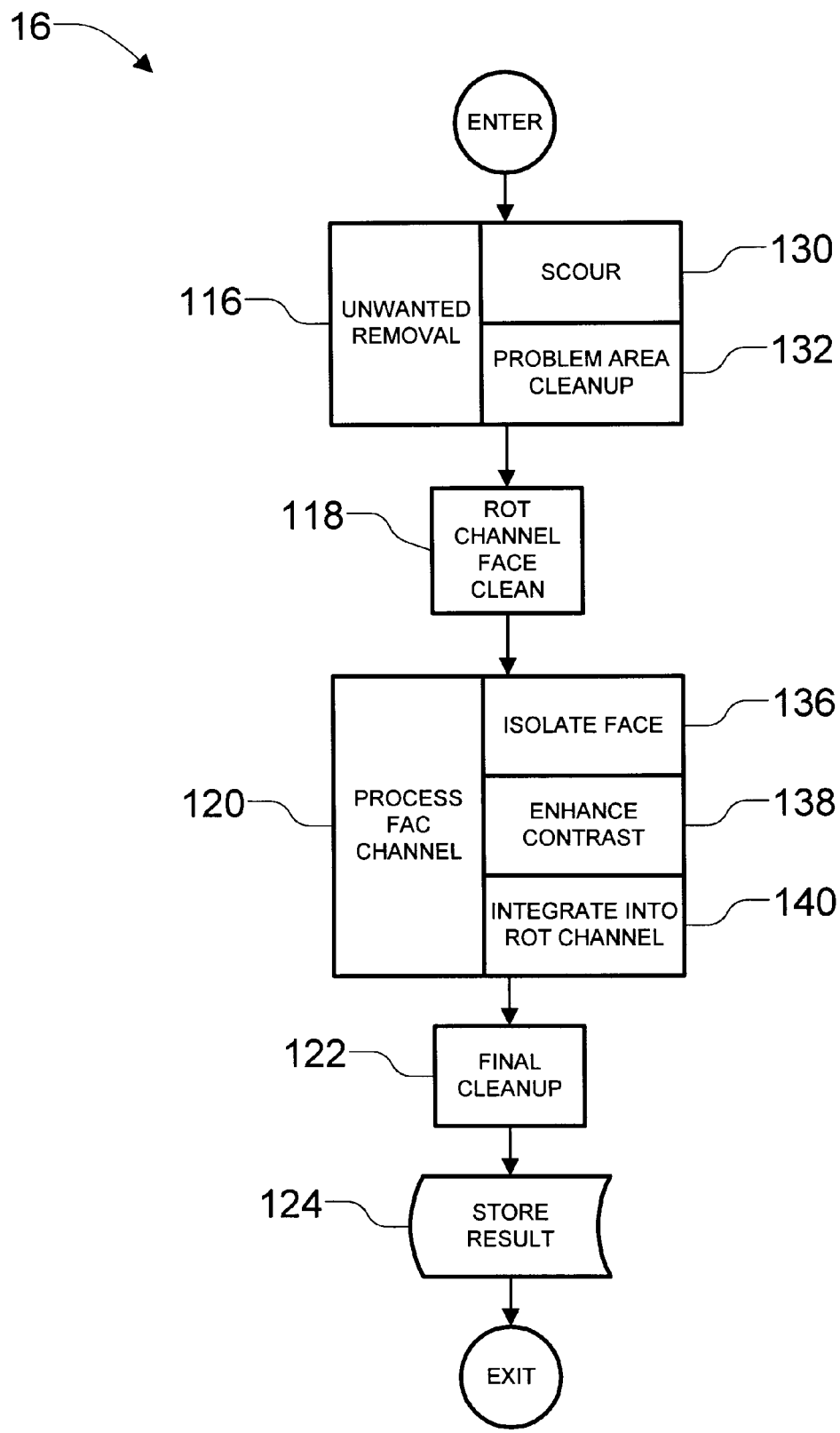
FIG. 4 is a flow chart depicting the sub-operations within step 16 of FIG. 1.

FIG. 4 illustrates in flowchart form the sub-operations of grabface. These are: step 116, removal of unwanted image areas; step 118, image clean up; step 120, "face" (i.e., target area) processing; step 122, final image cleanup; and step 124, storage of the results. Within some of these steps are sub-steps which may be optional.

Step 116 may include step 130, scouring; and step 132, hand cleanup of problem areas. Step 116 is performed because color-key techniques (e.g., blue screen or alpha channel methods) are not perfect. Some background objects get into images (due to shadows, props, image noise, etc.). Step 130 is an automatic scouring process that searches through the entire ROT channel image looking for connected clusters of pixels smaller than a user specified size, and "removes" these small areas by blanking corresponding pixels in the LAL channel. Step 132 is artist hand cleanup of any remaining problems. In the preferred embodiment, the artist views the ROT channel, but changes during this step affect the LAL channel directly. Examples of where step 132 might prove useful are removal of areas too large for automatic LAL channel cleanup, and removal of areas that overlap the edge of a character (e.g., a character passing in front of a background shadow).

Step 118 is cleanup of the "face" area targeted for grabface enhancement in the ROT channel (note again, not necessarily a human face). In the inventors' preferred embodiment this step is performed manually by artists. In general, detail is removed from the character's face in the ROT channel, but some may be intentionally left for later use to enhance quality. For example, some jawline or lip features may be left behind.

Step 120 is the pivotal part of the grabface process (step 16). Steps up to here are preparation, and steps after this are wrap-up. Step 120 may include: step 136, face isolation; step 138, contrast enhancement; and step 140, face reintegration into the ROT channel. Step 136 is grabbing the face in the FAC channel. For example, an artist may lasso or encircle the target face area with a selection tool, or another selection means may be used. In step 138 the contrast of the selection is enhanced (for example to emphasize eyes and mouth, and to carry expression from an original image sequence into the final rotoscoped product). This may be performed with a levels filter (as described above). In step 140 the enhanced FAC channel is integrated back into the cleaned up ROT channel (i.e., the product of step 118). Mixing of the FAC channel into the ROT channel can be controlled proportionally to optimize quality here. For a 50% mix, each channel is multiplied by 0.5 and then added together. For example, if the ROT channel were to have a weak influence, such as 10%, then it would be multiplied by 0.1, the lassoed FAC channel would be multiplied by 0.9, and the resulting ROT channel would be made the sum of these. Further, this mixing operation is subject to LAL channel identification of what is desired in the ROT channel.

Step 122, image final cleanup, is removal of stray clutter in the ROT channel image. This produces a cleaner more cartoon-like image. It also permits better image compression. And ultimately this produces better animation, although comparison with surrounding images for continuity is needed to obtain the best animation results. If only line art is desired (i.e., if the images are not to be colored), the rotoscoping process 10 is now finished.

Step 124 is storage of the result of step 16. This will be either the final version of the ROT channel, or the initial version of the COL channel (before extensive work upon it in step 18).

Coloring

If the rendered line art is to be colored, the bulk of the work for this is done in step 18 (FIG. 1). Various methods may be used for step 18. It may be carried out entirely manually by traditional rotoscope coloring techniques (i.e., paint and brush), after the ROT channel is projected onto a suitable physical media. Or it may be accomplished by use of conventional image processing software and artists who "paint" the ROT channel of step 96 on a computer screen.

The inventors have also found that some parts of coloring (i.e., step 18) can be performed concurrently with special rendering (i.e., step 16). For example, initial coloring work, such as gross surrounds and fills with color in non-sensative areas of images can be performed by less skilled artists while step 116 is carried out. Then coloring of sensative areas, such as faces, can be carried out by more skilled artists concurrent with their work on step 118 and step 120.

In addition to the above mentioned examples, various other modifications and alterations of the inventive rotoscoping process 10 may be made without departing from the invention. Accordingly, the above disclosure is not to be considered as limiting and the appended claims are to be interpreted as encompassing the entire spirit and scope of the invention.

Industrial Applicability

The present rotoscoping process 10 is well suited for application in producing line art cartoon-like renderings of individual images, and complete animation sequences from sequences of images. Potential sources for such images include photographs and film reels, or digital captures from television and computer screens (i.e., "screen captures").

As part of the present rotoscoping process 10, optional specialized rendering (step 16) can be performed in addition to the basic line art rendering task (step 14). This permits enhanced rendering quality and new rendering features which are not heretofore known in the art of rotoscoping. For example, highly detailed objects, which previously were regarded as unsuitable subject matter for rotoscoping because detail would be lost, are now suitable subjects when using the present rotoscoping process 10. Similarly, rotoscope processing alone has not been regarded as suitable for transferring highly expressive detail, such as emotional human facial expression or the tensing of an animal's muscles as it prepares to pounce on its prey. In the past such subject matters were avoided, or else required very labor-intensive manual artistic efforts, separate entirely from the underlying rotoscoping. However, using the inventive rotoscoping process 10, these become quite appropriate subject matter. Within step 16 the special needs of such subject matter can be handled in a highly efficient and largely automated manner, yet with total user artistic discretion. For example, if a user of the present rotoscoping process 10 wishes to enhance detail of the lips, say to effect a sneer, they may apply tailored automatic processing of just the lips or they may employ one of the plethora of widely available digital image editing tools to manually override the process and artistically hand edit-in lip detail. Users can similarly suppress detail, say to impart an wide-pupil dazed type look to a character's eyes, by tailoring automatic processing or by using a digital editing tool to "cut" out or to "paste" in image pixels.

Furthermore, as part of the present rotoscoping process 10, in addition to the basic line art rendering task (step 14), optional image coloring (step 18) may be performed, either in addition to or without specialized rendering (step 16). Within step 18, colorizing of images is handled in a highly efficient and largely automated manner, yet also with total user artistic discretion retainable.

The inventors have used the present rotoscoping process 10 to produce a complex three disk CD ROM computer game by filming actors, rotoscoping the captured image sequences, and from them crafting interactive and branching dramatic animated sequences which take place in a rendered 3D world. This product is titled THE LAST EXPRESS, and is based upon an original screenplay which was initially the length of two feature length films. The three CD ROM disk set includes over 2,000 interactive sequences (ISes) and 250 non-interactive sequences (NISes). The ISes are concatenated and branched through to present the story line to the game player. As this is done, NISes varying from ten seconds to three minutes are triggered by various events and are presented in a manner such that the game player is switched at different story branches between first person exploratory and third person dramatic modes. Forty characters are used in the story, and the presentation of subtle expression is a vital part of the game, both to challenge the player's powers of observation and deductive reasoning, and to convey the psychological complexity of the story line (a murder-spy mystery occurring on the eve of World War I and set on the Orient Express train from Paris to Constantinople). Over 25,000 image frames would have had to have been hand-traced if manual rotoscoping were used for this project. Presented with such a Herculean task, and not having five years and tens of millions of dollars to employ large Hollywood-style animation teams, the inventors instead developed the present rotoscoping process 10.

Pre-production of the inventors' project took only two months. And notably, major portions of that were devoted to casting the forty roles with actors having appropriate characteristics for the particular project. Very extensive use of color-keying was made, and this required special attention to the preparation of the film set and props. Both blue-screen and rotoscopable furniture were constructed, and major parts of the set, which were to be artistically hand edited-in later, were laid out with blue colored tape and guide wires (i.e., defining virtual walls, doors, and corridors).

The filming schedule for this example project was also quite short, only three weeks, with six days of actual shooting in each. Despite the newness of the technology upon which this entire project depended, this schedule was well adhered to, and that is in large part directly attributable to use of the inventive rotoscoping process 10. For example, due to the use of the virtual sets and by shooting without worrying about sound sync (since it was digitally correctable later, say, if an actor missed a line), the NISes material was shot in only eleven days. A conventional Hollywood-type approach to this project would have required 80 to 120 days.

Further, by using the inventive rotoscoping process 10, problems were prevented which would not normally be caught during shooting, thereby avoiding extensive additional effort to correct them later. The rotoscoping crew performed on-the-fly rotoscope tests, by literally setting up shop on the set. Due to their efforts, problems which did occur were promptly caught and corrected (for example, many of the virtual set markers did not color-key matte out properly, even though painted in the film industry standard Ultimatte Blue). While use of color-key feedback is standard in the industry, particularly in video productions, the enhanced speed and scope of such feedback possible with the present rotoscoping process 10 is a welcome improvement.

The actual inventive rotoscoping process 10 is particularly suitable for use with present and anticipated industrial technology. Conventional cameras using photographic stock are readily presently usable in the invention for image capture (step 34), as is digitizing of captured images (step 36), for example using conventional scanning techniques on single images or film stock to digital D1 format for image sequences. Alternately, suitable non-interlaced format direct digital camera equipment is now becoming available for capturing images directly (step 46).

The preferred embodiment described herein uses a number of transfers of the digital images, including: 1) capture system to D1; 2) D1 to archival storage; 3) archival storage to computer hard disk (preferably networked); 4) computer hard disk to ultimate user media. While complex, this is presently the most cost effective solution to the transfer and storage needs of the rotoscoping process 10. However, it is reasonable to anticipate major changes in the nature and capacity of storage media available for use with the present invention. For example, systems capable of image capture directly to a "computer media" are now becoming widely available and economically viable. Further, the ultimate user media (i.e., the end product) may soon be entirely produced on computer systems without the need for any transfer steps. Digital Video Disks (DVD) are generally expected to eliminate the remaining distinctions between what are considered media merely suitable for use with computers, and media suitable for use to store entertainment such as music and movies.

Industrial resources to work the inventive rotoscoping process 10 are not critical. Once images are stored in an accessible location, say on a computer hard drive on a network, conventional personal computers can be used for all processing (e.g., step 14, step 16, and step 18). Conventional image editing tools can be used for processing, albeit in a very inefficient manner, or custom optimized software may be written and employed. The inventors have written a number of custom software routines to perform the individual steps of FIG. 3 and FIG. 4, and they execute these routines with a simple script (i.e., batch) language. However, the actual programming of these routines themselves is not particularly novel. For individual steps, given the data input formats, the command parameters, and the outputs desired, programmers of average skill can write similar routines in any of a variety of computer languages.

For the above, and other, reasons, it is expected that the present inventive rotoscoping process 10 will have widespread industrial applicability. Therefore, it is expected that the commercial utility of the present invention will be extensive and long lasting.

In the claims:

1. An image rendering process, comprising:
   (a) obtaining an original image into an image channel; and
   (b) scrubbing said image channel, to enhance lines which will appear as transitions at borders of a subject in said line art representation;
   (c) scaling said image channel up in size, to render said lines more finely;
   (d) creating an alpha channel from said image channel, to denote key content appearing in said original image;
   (e) creating a monochrome channel from said image channel;
   (f) applying levels filtering to said monochrome channel, to increase contrast of low and mid-range information and thereby obtain further visual definition of said lines;
   (g) applying high-pass filtration to the monochrome channel, to filter out low frequency spatial information and thereby obtain further visual definition of said lines;
   (h) increasing contrast in said monochrome channel, to obtain further visual definition of said lines;
   (i) darkening said monochrome channel, to strengthen visual definition of said lines;

(j) converting said monochrome channel to final size;

(k) lining said monochrome channel, to produce consistent thin appearance of said lines; and (l) removing noise from said monochrome channel, thereby rendering said image channel into a rotoscope channel and producing a line art representation of said original image.

2. The image rendering process of claim 1, further comprising:

using a color-key background while obtaining said original image in step a of claim 1; and using said alpha channel of step c of claim 1 to exclude said color-key background when denoting said key content of said original image.

3. The image rendering process of claim 1, wherein step g comprises:

applying median filtration to said monochrome channel, to blur out noise; and applying further levels filtering to said monochrome channel, to increase contrast.

4. The image rendering process of claim 1, wherein step h comprises:

applying further median filtration to said monochrome channel, to blur out noise; and applying further levels filtering to said monochrome channel, to darken said lines.

5. The image rendering process of claim 1, wherein step i comprises:

scaling said monochrome channel down in size; and clipping said monochrome channel in at least one orthogonal dimension.

6. The image rendering process of claim 1, wherein step j comprises:

converting to a consistent size said lines which are at said borders of said subject; and placing a consistent thickness line around said borders of said subject.

7. The image rendering process of claim 1, wherein step j comprises:

determining a subject size by relating said subject to said monochrome channel;

converting to a plurality of consistent sizes instances of said lines which are located at said borders of said subject, based upon said subject size;

placing a consistent thickness line around said borders of said subject; and applying further levels filtering to said monochrome channel, based upon said subject size, to better visually define smaller instances of said subject.

8. The image rendering process of claim 1, wherein step k includes:

despeckling said monochrome channel by removing stray pixels.

9. The image rendering process of claim 1, further comprising:

optimizing quality of said line art representation by selectively processing only portions of said monochrome channel which are designated by said alpha channel.

10. The image rendering process of claim 1, further comprising:

optimizing speed of the image rendering process by selectively processing only portions of said monochrome channel which are designated by said alpha channel.

11. The image rendering process of claim 1, after step k further including:

(l) creating a face channel from said monochrome channel, which is the size of said rotoscope channel;

(m) creating a little alpha channel form said alpha channel, which is the size of said rotoscope channel;

(n) removing unwanted content from said rotoscoped channel;

(o) reviewing and cleaning up said rotoscoped channel by an artist;

(p) isolating at least one key region in said face channel;

(q) enhancing the contrast of said key regions in said face channel;

(r) integrating said face channel into said rotoscoped channel, based upon the state of said little alpha channel; and (s) cleaning up said rotoscoped channel by an artist, to thereby render said rotoscope channel into an enhanced line art representation of the original image.

12. The image rendering process of claim 11, wherein step n includes:

searching said rotoscope channel for clusters of pixels smaller than a user specified size; and blanking corresponding pixels in said little alpha channel, to thereby flag said clusters of pixels for later removal from said rotoscope channel.

13. The image rendering process of claim 11, wherein step n includes:

reviewing and selecting problem areas in said rotoscope channel by an artist; and blanking corresponding pixels in said little alpha channel, to thereby flag said problem areas for later removal from said rotoscope channel.

14. An improved rotoscoping process of the type in which an original image is used to produce an image channel and also a rotoscope channel containing a line art representation of the original image, wherein the improvement comprises:

(a) creating a monochrome face channel from said rotoscope channel;

(b) creating an alpha channel from said image channel;

(c) removing unwanted content from said rotoscope channel;

(d) reviewing and cleaning up by an artist of said rotoscope channel;

(e) isolating at least one key region in said face channel;

(f) enhancing the contrast of said key regions in said face channel;

(g) integrating said face channel into said rotoscope channel, based upon the state of pixels in said alpha channel; and (h) cleaning up by an artist of said rotoscope channel, to thereby render an enhanced line art representation of the original image.

15. The image rendering process of claim 14, wherein step c includes:

searching said line art representation for clusters of pixels smaller than a user specified size; and blanking corresponding pixels in said alpha channel, to thereby flag said clusters of pixels for later removal from said rotoscope channel.

16. The image rendering process of claim 14, wherein step c includes:

reviewing and selecting problem areas in said rotoscope channel by an artist; and blanking corresponding pixels in said alpha channel, to thereby flag said problem areas for later removal from said rotoscope channel.

17. The image rendering process of claim 14, further comprising:

coloring said enhanced line art representation.

18. The image rendering process of claim 14, further comprising:

optimizing quality of said enhanced line art representation by selectively processing only portions of said rotoscope channel which are designated in said alpha channel as representing key content.

19. The image rendering process of claim 14, further comprising:

optimizing speed of the image rendering process by selectively processing only portions of said rotoscope channel which are designated in said alpha channel as representing key content.

20. The image rendering process of claim 14, further comprising coloring said rotoscoped channel.

21. A cartoon image having an enhanced line art representation prepared in accordance with the image rendering process of claim 14.

22. A motion picture animation having a plurality of sequential enhanced line art representations prepared in accordance with the image rendering process of claim 14.

* * * * *